United States Patent
Alcott et al.

(10) Patent No.: US 10,332,196 B2
(45) Date of Patent: Jun. 25, 2019

(54) RETAIL WEBSITE USER INTERFACE, SYSTEMS AND METHODS

(71) Applicant: TARGET BRANDS, INC., Minneapolis, MN (US)

(72) Inventors: Jennifer Alcott, Minneapolis, MN (US); Chad Weber, Minneapolis, MN (US); Peter Stromquist, Minneapolis, MN (US); Josh Dingman, Minneapolis, MN (US); Robert Stenzinger, Minneapolis, MN (US); Nicole Netland, Minneapolis, MN (US); Thibault Roux, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 65 days.

(21) Appl. No.: 15/845,399

(22) Filed: Dec. 18, 2017

(65) Prior Publication Data

US 2018/0174228 A1   Jun. 21, 2018

Related U.S. Application Data

(63) Continuation of application No. 14/140,901, filed on Dec. 26, 2013, now Pat. No. 9,846,904.

(51) Int. Cl.
*G06Q 30/02* (2012.01)
*G06Q 30/06* (2012.01)

(52) U.S. Cl.
CPC ..... *G06Q 30/0643* (2013.01); *G06Q 30/0201* (2013.01); *G06Q 30/0282* (2013.01)

(58) Field of Classification Search
USPC .............................. 705/7.11–7.42, 26.1–26.2
See application file for complete search history.

(56) References Cited

U.S. PATENT DOCUMENTS

| | | |
|---|---|---|
| 5,623,590 A | 4/1997 | Becker et al. |
| 6,320,602 B1 | 11/2001 | Burkardt et al. |
| 7,370,284 B2 | 5/2008 | Andrea et al. |
| D571,820 S | 6/2008 | Scott et al. |
| D582,936 S | 12/2008 | Scalisi et al. |
| D589,974 S | 4/2009 | Kase |
| D591,765 S | 5/2009 | Amacker |
| 7,607,150 B1 | 10/2009 | Kobayashi et al. |

(Continued)

OTHER PUBLICATIONS

Bratthall, et al., "Intergrating Hundred's of Products through One Architecture—The Industrial IT architecture", ICSE'02, May 19-25, 2002, Orlando, FL. (Year: 2002).*
Print out from http://fab.com/department/furniture/?ref=subnav; printed on or about May 7, 2014; 1 page; possibly available as early as May 2, 2013 according to https://web.archive.org/web/20130502003733/http://fab.com/department/furniture/?ref=subnav.
Print out from internet archive https://web.archive.org/web/20120609001741/http://www.zappos.com/new-shoes~2W?s=isNew/desc/goLiveDate/desc/; archived on Jun. 9, 2012; 1 page.

(Continued)

*Primary Examiner* — Amber A Misiaszek
(74) *Attorney, Agent, or Firm* — Hamre, Schumann, Mueller & Larson, P.C.

(57) ABSTRACT

A web site that presents a user interface that displays images of products to a user. The product images that are displayed are of products that are recently trending or popular as determined by data derived from one or more sources. Each product image is displayed without the price of the respective product and without text naming, describing or identifying the respective product. Therefore, the user interface is constructed to focus on the trending products themselves so that the user interface is clean and uncluttered, allowing customers to focus on the trending products for possible purchase.

18 Claims, 6 Drawing Sheets

(56) References Cited

U.S. PATENT DOCUMENTS

| | | | |
|---|---|---|---|
| 7,818,689 B2 | 10/2010 | Wada | |
| 8,386,486 B2 | 2/2013 | Zhang et al. | |
| D695,781 S | 12/2013 | Edwards et al. | |
| 8,788,365 B2 | 7/2014 | Paul et al. | |
| 8,819,726 B2 | 8/2014 | Wetzer et al. | |
| 8,861,866 B2 | 10/2014 | Zhang et al. | |
| 8,873,851 B2 | 10/2014 | Fedorovskaya et al. | |
| 8,880,496 B2 | 11/2014 | Nagaralu et al. | |
| D732,562 S | 6/2015 | Yan et al. | |
| 9,070,171 B2 | 6/2015 | Guo et al. | |
| 9,846,904 B2 | 12/2017 | Alcott et al. | |
| 2003/0007016 A1 | 1/2003 | Laffey et al. | |
| 2010/0191578 A1 | 7/2010 | Tran et al. | |
| 2012/0095863 A1* | 4/2012 | Schiff | G06Q 30/0631 705/26.7 |
| 2012/0130862 A1* | 5/2012 | Tedjamulia | G06Q 30/0601 705/27.1 |
| 2012/0140987 A1 | 6/2012 | Singh et al. | |
| 2012/0197750 A1* | 8/2012 | Batra | G06Q 30/0631 705/26.7 |
| 2013/0036164 A1 | 2/2013 | Carduner et al. | |
| 2013/0073972 A1 | 3/2013 | Yung et al. | |
| 2013/0239049 A1 | 9/2013 | Perrodin et al. | |
| 2013/0290172 A1* | 10/2013 | Mashinsky | G06Q 20/12 705/39 |
| 2013/0297694 A1 | 11/2013 | Ghosh | |
| 2013/0330019 A1 | 12/2013 | Kim et al. | |
| 2014/0012925 A1 | 1/2014 | Narayanan et al. | |
| 2014/0019264 A1 | 1/2014 | Wachman et al. | |
| 2014/0040371 A1 | 2/2014 | Gurevich et al. | |
| 2014/0180864 A1 | 6/2014 | Orlov et al. | |
| 2014/0201227 A1 | 7/2014 | Hamilton-Dick et al. | |
| 2014/0278998 A1 | 9/2014 | Systrom et al. | |
| 2014/0279068 A1 | 9/2014 | Systrom et al. | |
| 2014/0282256 A1 | 9/2014 | Fish et al. | |
| 2014/0310079 A1* | 10/2014 | Girard | G06Q 30/00 705/14.16 |
| 2014/0337151 A1* | 11/2014 | Crutchfield | G06F 1/1601 705/17 |
| 2015/0013016 A1 | 1/2015 | Kanter et al. | |
| 2015/0039176 A1 | 2/2015 | Fish | |
| 2015/0049953 A1 | 2/2015 | Movellan et al. | |
| 2015/0058079 A1* | 2/2015 | Freund | G06Q 30/0202 705/7.31 |
| 2015/0127592 A1 | 5/2015 | Yan et al. | |
| 2015/0127727 A1 | 5/2015 | Tseng et al. | |
| 2015/0149539 A1 | 5/2015 | Shukla et al. | |
| 2015/0154167 A1 | 6/2015 | Arhin et al. | |
| 2015/0170039 A1 | 6/2015 | Hostyn et al. | |
| 2015/0186419 A1 | 7/2015 | Agrawal | |
| 2015/0186977 A1 | 7/2015 | Leonard et al. | |
| 2015/0186985 A1 | 7/2015 | Alcott et al. | |
| 2015/0206349 A1 | 7/2015 | Rosenthal et al. | |
| 2015/0220854 A1 | 8/2015 | Dolan | |
| 2015/0220996 A1 | 8/2015 | Bhamidipati et al. | |
| 2015/0227972 A1 | 8/2015 | Tang | |
| 2015/0237056 A1 | 8/2015 | Arnold et al. | |
| 2016/0148298 A1 | 5/2016 | Tang et al. | |

OTHER PUBLICATIONS

Print out from internet archive https://web.archive.org/web/20131114195516/http://top-pins.apps.zappos.com/; archived on Nov. 14, 2013; 1 page.

Print out from internet archive https://web.archive.org/web/20131028210234/http://glance.apps.zappos.com/trending?; archived on Oct. 28, 2013; 1 page.

Office Action from Canadian Patent Application No. 155,236, dated Nov. 22, 2014 (3 pages).

Office Action from Canadian Patent Application No. 155,235, dated Nov. 22, 2014 (2 pages).

Office Action from Canadian Patent Application No. 2,842,970, dated Jan. 23, 2015 (3 pages).

"Amazigg:Trending amazon products", https://web.archive.org/web/20120220075432/htpp://www.amazigg.com/weekly-top/, Feb. 20, 2012 (3 pages).

"Explore collections", https://web.archive.org/web/20131114011323/http://www.ebay.com/cln, Nov. 14, 2013 (4 pages).

"Trending hot products", https://web.archive.org/web/20130104015040/http://www.alibaba.com/showroom/trending-hot-products.htm, Oct. 14, 2013 (8 pages).

Design U.S. Appl. No. 29/477,737, filed Dec. 26, 2013 (2 pages).

"Spark Studio" found online at http://www.walmart.com/spark/category/all, in existence prior to Dec. 26, 2013 (1 page).

Rachel Arthur, "Retail's 7 Most Innovative Holiday Campaigns," found online at http://fashionista.com/2013/12/holiday-retail-campaigns, published Dec. 16, 2013 (6 pages).

Dhani Mau, "Rebecca Minkoff and Toms Open Up Digital Storefronts," found online at http://fashionista.com/2013/11/rebecca-minkoff-and-toms-open-up-digital-storefronts, published Nov. 25, 2013 (3 pages).

Design U.S. Appl. No. 29/477,738, filed Dec. 26, 2013 (3 pages).

Printout from Canopy.co, found online at https://web.archive.org/web/20130805071406/http:/canopy.co/; archived on Aug. 5, 2013; printed on May 18, 2017 (1 page).

U.S. Non-final Office Action for design U.S. Appl. No. 29/477,738, dated Mar. 14, 2016 (8 pages).

Bratthall et al., "Integrating Hundred's of Products through One Architecture—the Industrial IT architecture," ICSE '02, May 19-25, 2002, Orlando, FL, p. 604-614.

Non-final Office Action issued for U.S. Appl. No. 14/140,901, dated Mar. 18, 2016 (17 pages).

Final Office Action issued for U.S. Appl. No. 14/140,901, dated Sep. 20, 2016 (20 pages).

U.S. Non-final Office Action, issued in the U.S. Appl. No. 15/070,652, dated Nov. 26, 2018, 46 pages.

"New Stock Photos and Images, Best Selling", Dreamstime, Mar. 13, 2015, 3 pages, available at https://www.dreamstime.com/new-stock-photos-images (Year: 2015).

Non-Final Office Action, issued in the pending U.S. Appl. No. 15/070,667, dated Jun. 14, 2018, 49 pages.

U.S. Final Office Action, issued in the U.S. Appl. No. 15/070,667, dated Jan. 10, 2019, 33 pages.

* cited by examiner

RETAIL WEBSITE USER INTERFACE, SYSTEMS AND METHODS

FIELD

This disclosure generally pertains to the field of user interfaces on web sites that offer products for purchase, such as on retailer websites.

BACKGROUND

Online shopping is a continuously growing industry. A user engaging in online shopping can locate potential products of interest in a number of ways, including by conducting Internet searching or going directly to a website known the user.

Improved ways to present products to a user for possible purchase on a website are desirable.

SUMMARY

A website is described herein that presents a user interface that displays images of products to a user. The product images that are displayed are of products that are recently trending or popular as determined by data derived from one or more sources. The user interface is constructed to focus on the trending products themselves so that the user interface is clean and uncluttered, allowing customers to focus on the trending products for possible purchase. The website can be, for example, a website that is owned, operated and/or controlled by a retail company, with the products that are displayed being for sale by the retail company either in a retail store or on-line on the same website or on a separate website.

The products that are displayed are products that are recently trending within a predetermined time period prior to being displayed. In one embodiment, the predetermined time period is within the past seven days prior to being displayed. In another embodiment, the predetermined time period is between the past three to seven days prior to being displayed. In still another embodiment, the predetermined time period is within the past three days prior to being displayed.

No images are displayed of products that were trending outside of the predetermined time period and that are no longer trending. The user is therefore presented with only the most recent or current trending products.

Unless otherwise defined by the Applicant, a trending product is a product that is currently popular, in style or in vogue. A product is determined to be trending based on data derived from one or more sources. For example, the data can be sales data on the product, product inventory data, reviews of or comments on the product such as from prior purchasers or users, recommendations or comments on the product from one or more social media sources, newspaper and/or magazine articles, commentary on Internet blogs, or from any other source(s) that can indicate the trending nature of the product. In one embodiment, a product is determined to be trending based on the number of positive reviews of the product and/or number of recommendations of the product via at least one social network.

Unless otherwise defined by the Applicant, a social network is a virtual community or network in which people can create, share, and/or exchange information and ideas, for example on-line via the Internet. Examples of social networks from which data can be derived in order to determine whether a product is trending include, but are not limited to, Pinterest, Facebook, Instagram, Twitter, Google+, and the like.

Unless otherwise defined by the Applicant, a recommendation of the product from one or more social networks comprises, in one example, the use of a mechanism made available by a social network by which a person can indicate an expression of approval or commendation of the product. For example, in the case of Pinterest, a pin or pinning a product is a form of recommendation. In the case of Facebook, Recommendations or Like activity can be a form of recommendation. A recommendation of the product from one or more social networks can also be derived from general discussions of the product contained on the social network(s).

In one embodiment, one or more filters can be applied to certain trending products to limit the trending products that are displayed on the user interface. For example, trending products that are not currently in stock of the retailer may not be displayed. In another example, trending products that have not received a sufficient average review score greater than a predetermined threshold may not be displayed. In another example, certain categories of trending products may not be displayed. Categories that are not displayed can include, but are not limited to, out of season trending products (i.e. only in season trending products would be displayed) and others. Out of/in season can refer to, for example, a particular holiday or a particular season of the year. For example, a Christmas-related trending product may only be displayed for a predetermined time period prior to Christmas, but not displayed after Christmas. In another example, a winter or cold weather-related trending product may only be displayed during certain months of the year, but not displayed in the summer months.

In one embodiment, a system includes a graphical user interface (GUI) displayed on a display device. The GUI includes a plurality of product images displayed on the display device, each product image being of a product that is determined to be trending within the past seven days or less prior to being displayed. Each product image is displayed without the price of the respective product and without text naming, describing or identifying the respective product.

In another embodiment, an Internet website system includes at least one server that is connectable to the Internet and that is configured to provide a website that is viewable on the Internet. The website displays a plurality of separate product images in a plurality of rows and columns, and each product image is of a product that is for sale by a company and has received at least one positive product review and/or has received at least one recommendation via at least one social network within a predetermined time period prior to being displayed. Each product image is displayed without the price of the respective product and without text naming, describing or identifying the respective product. In addition, the website does not display any product images of products that have not received at least one positive product review or at least one recommendation via at least one social network within the predetermined time period. Further, each product image is of a product that is in stock for sale by the company.

In still another embodiment, a computer-implemented method of presenting products to a consumer for purchase via a graphical user interface (GUI) on a display device of the consumer includes determining products that are trending within the past seven days. Via a website that is accessible by the consumer and that is rendered via one or more servers, displaying on the display device of the consumer a product image of each trending product, and displaying each product image without the price of the respective product and without text naming, describing or identifying the respective product.

DRAWINGS

FIG. 1 schematically illustrates an exemplary system for implementing the GUI, systems and methods described herein.

DETAILED DESCRIPTION

A website is described that presents a user interface that displays images of products to a user. The product images that are displayed are of products that are determined to be recently trending or popular within a predetermined time period prior to being displayed. The user interface is constructed to focus on the trending products themselves so that the user interface is clean and uncluttered, allowing customers to focus on the trending products for possible purchase.

The website can be, for example, a website that is owned, operated and/or controlled by a retail company, with the products that are displayed being for sale by the retail company either in a retail store or on-line on the same website or on a separate website.

Figure 1:
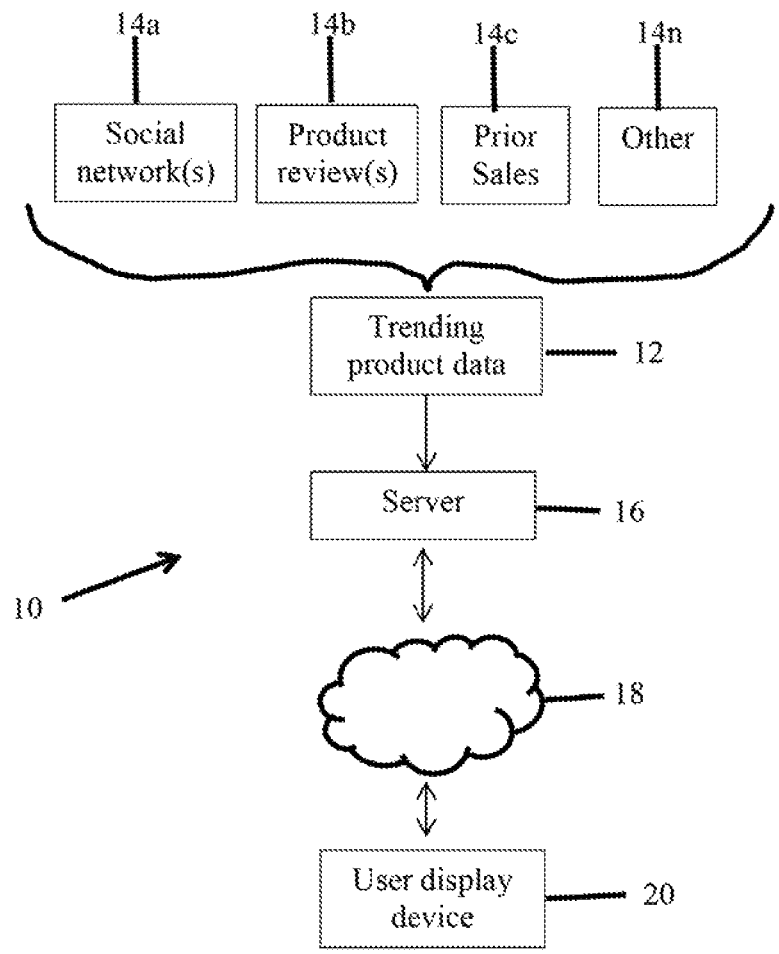

With reference to FIG. 1, an exemplary system 10 is illustrated for implementing the GUI, systems and methods described herein. In the system 10, trending product data is gathered 12 from one or more sources 14a, b, c . . . n. The trending product data is directed to a server 16 which makes available a website with a GUI discussed below with respect to FIGS. 2-4. The website is made available over the Internet 18 via conventional means, allowing a user to access and view the website via a suitable display device 20.

Figure 5:
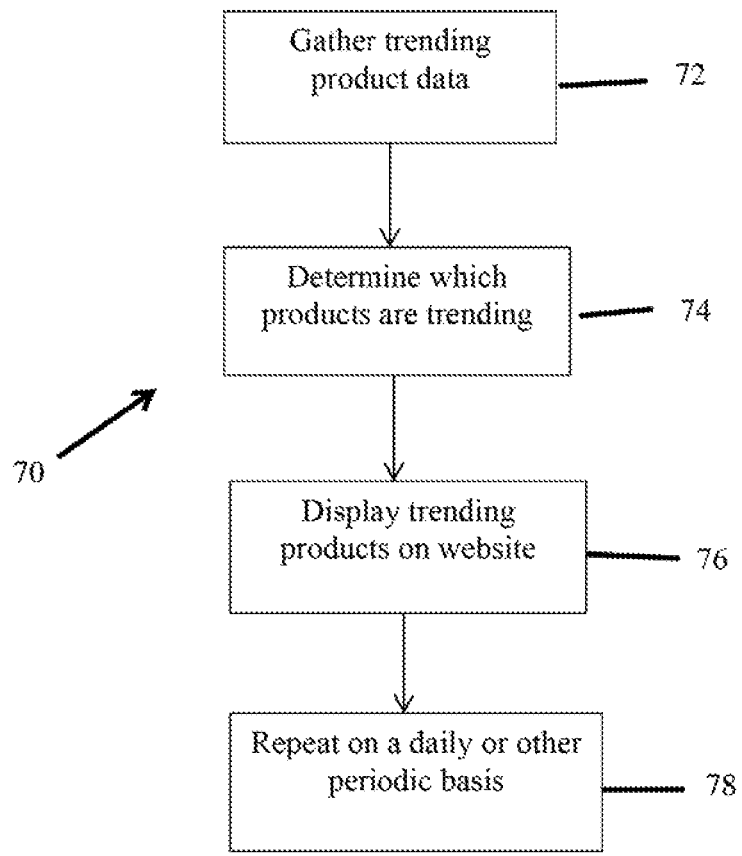
FIG. 5 is a flow chart depicting an exemplary process for displaying trending products on the website GUI.

FIG. 5 illustrates a flow chart depicting an exemplary process 70 for displaying trending products on the website GUI. In the process, the trending product data is gathered 72, and it is then determined which products are trending 74. The trending products are displayed 76 on the website GUI. This process is then repeated on a daily or other periodic basis 78 in order to continually refresh the trending products displayed on the GUI on the periodic basis.

The trending product data is data covering a relatively recent, predetermined time period. For example, the predetermined time period can cover data from the past seven days. In another embodiment, the predetermined time period can cover data from between the past three to seven days. In still another embodiment, the predetermined time period can cover data from within the past three days or less. In yet another embodiment, the predetermined time period can cover data from the past three days.

By limiting the trending product data to relatively recent data, the trending products that are ultimately displayed on the GUI are limited to recently trending or popular products within the same predetermined time period. In addition, no product images are displayed of products that are not trending within the predetermined time period. Therefore, older products that may have been trending in the past, but not trending within the relatively recent, predetermined time period, are not displayed.

The data for determining whether or not a product is trending can be provided from one or more of the data sources 14a,b . . . n. The data sources 14a,b . . . n can be any sources of data from which one can make a determination as to whether a particular product in question is trending. For example, a product can be determined to be trending if it has: a) a certain number or more of positive recommendations or positive comments on the product from one or more social network sources; b) a certain number or more of positive reviews of or positive comments on the product such as from prior purchasers or users; c) a certain amount or greater of sales (for example, raw number of sales or dollar amount) of the product; d) a certain number or greater of mentions of the product in newspaper and/or magazine articles, commentary on Internet blogs, or the like.

In one embodiment, a product is determined to be trending based on the number of positive reviews of the product and the number of recommendations of the product via at least one social network.

In FIG. 1, the data source 14a can be one or more social networks. Examples of social networks from which data can be derived in order to determine whether a product is trending include, but are not limited to, Pinterest, Facebook, Instagram, Google+, Twitter, and the like. In one embodiment, the data is a recommendation of the product from one or more of the social networks. A recommendation can be a positive comment on the product by a user of the social network, or a recommendation can be from a specifically designed approval mechanism provided by the social networking site. For example, in the case of Pinterest, a pin or pinning a product is a form of a specifically designed approval mechanism for providing a recommendation. In the case of Facebook, Recommendations or Like activity can be a form of a specifically designed approval mechanism to provide a recommendation. A recommendation of the product can also be derived from general discussions of the product contained on the social network(s).

In one possible specific embodiment, a retailer can provide on their main website a plurality of links to various social networks (for example, Facebook, Google+, Twitter, Pinterest) or an e-mail link, that allow someone shopping on the retailer website to provide a positive recommendation of products available on the website. Data on the number of times within the relatively recent predetermined time period that people select one of the social network links from the retailer website to provide a positive recommendation, or to send an e-mail from the retailer website with positive comments on the product, can be gathered and used to determine that a product is trending. The products that are trending can then be displayed on a separate website having a separate web address or even on a separate page of the main website.

Returning to FIG. 1, the data source 14b can be product reviews provided within the relatively recent predetermined time period, for example from a Product Review option available on the retailer main website that allows a person to submit a review, for example a star rating review system, on the product or from other product review sources. In one embodiment, in order for a product to be considered trending, the product needs to receive a sufficient average review score greater than a predetermined threshold. If the average review score does not exceed the threshold, the product is not considered trending and is not displayed on the GUI. For example, in the case of a five star rating review system, with five stars being the highest rating, if the average of all reviews for the product during the time period equals four stars or more, then the product is considered trending. Conversely, if the average of all reviews for the product during the time period is less than four stars, the product is not considered trending and is not displayed. The use of a five star rating system and the use of four stars as the threshold are exemplary only, and other types of rating review systems and other thresholds can be used.

The data source 14c can be data on sales of the product within the relatively recent predetermined time period. The sales data can be from the retailer main website or other websites run by the retailer and/or from fixed stores run by the retailer.

Other data sources 14n, public or private, can also be used as long as one can determine the trending nature of products by deriving data from the data sources. Examples of other data sources include, but are not limited to, newspaper and/or magazine articles, commentary on Internet blogs, and the like.

The trending product data that is gathered can be limited to only data from the predetermined time period. Alternatively, the trending product data that is gathered can include data from outside the predetermined time period, but which is then narrowed down to remove data that is outside the predetermined time period.

The trending product data is then analyzed, for example by a computer processing device, to determine which products are trending. In one embodiment, any product that has received for example at least one positive review and/or at least one recommendation via at least one social network can be judged to be trending. In another embodiment, any product that has received for example at least one positive review and at least one recommendation via at least one social network can be judged to be trending.

Products that are determined to be trending are provided to the server 16 which provides an image of the product on the GUI of the website. A user interested in viewing the trending products can access the website via the Internet 18. The user can access the website in any conventional manner including, but not limited to, using a personal computer (PC), a laptop computer, a mobile device such as a smartphone, or a tablet-style device. The GUI of the website is displayed on the display device 20, for example a monitor connected to the PC, the laptop screen, the screen of the mobile device, or the screen of the tablet.

Figure 6:
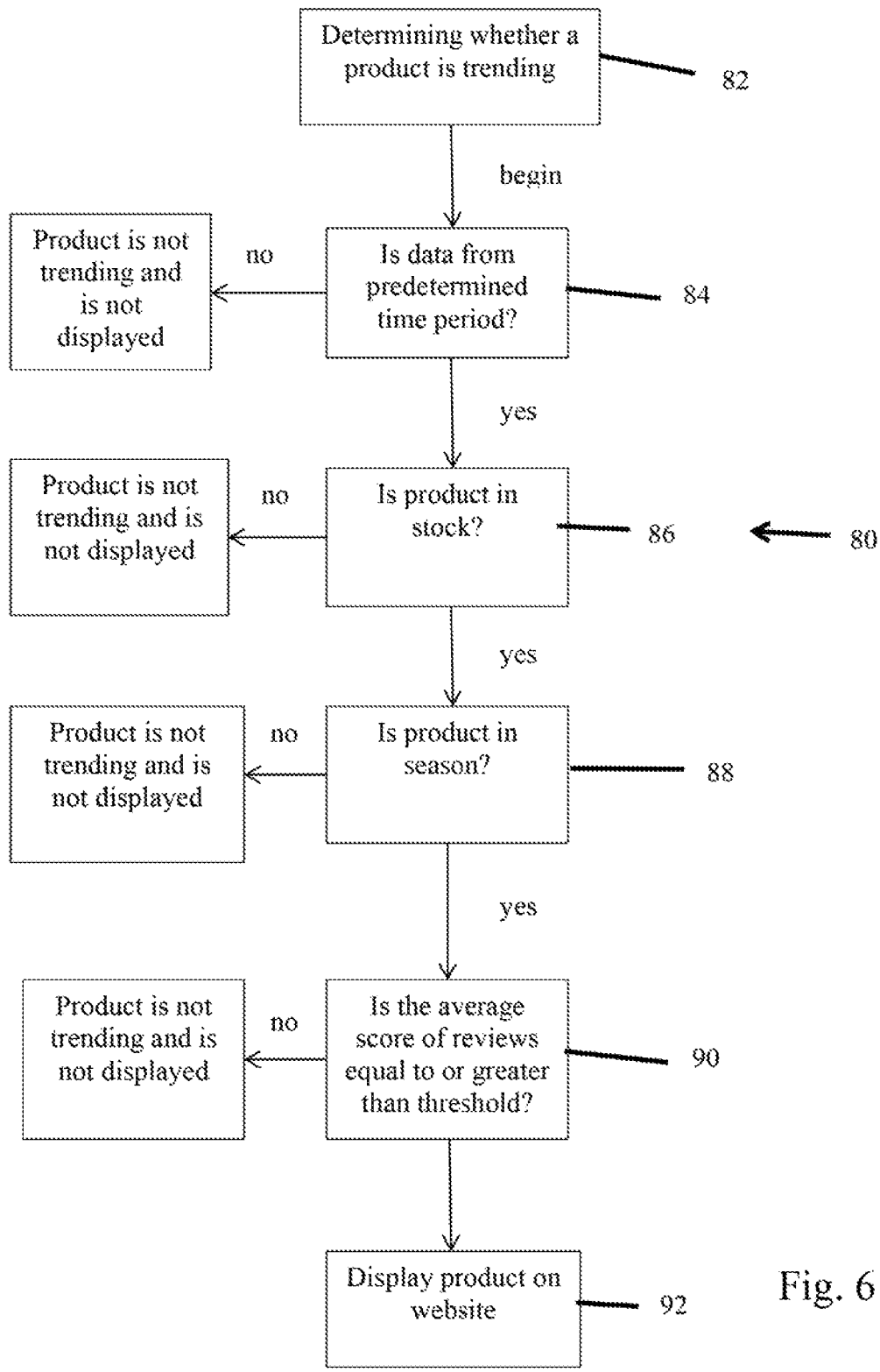
FIG. 6 is a flow chart depicting an exemplary process for determining whether a product is trending.

Referring to FIG. 6, an exemplary process 80 is illustrated for determining whether a product is trending 82. In the process 80, it is determined whether or not the trending product data is from the predetermined time period 84. If the data is not from the predetermined time period, the product is not considered trending and is not displayed. If the data is from the predetermined time period, the process proceeds to apply one or more filters 86, 88, 90. The filters 86, 88, 90 can be applied singly or in any combination thereof, as well as applied in any desired order.

In the filter 86, it is determined whether the product is in stock. If "no", then the product is not considered trending and is not displayed. If "yes", the process can proceed to the next filter 88 or, if no further filtering is desired, the product can be displayed on the website 92.

In the filter 88, it is determined whether the product is in season or otherwise is part of a product category that should not be displayed. If "no", then the product is not considered trending and is not displayed. If "yes", the process can proceed to the next filter 90 or, if no further filtering is desired, the product can be displayed on the website 92.

In the filter 90, it is determined whether the average review score of the product is equal to or greater than the predetermined threshold. If "no", then the product is not considered trending and is not displayed. If "yes", the product can be displayed on the website 92.

Figure 2:
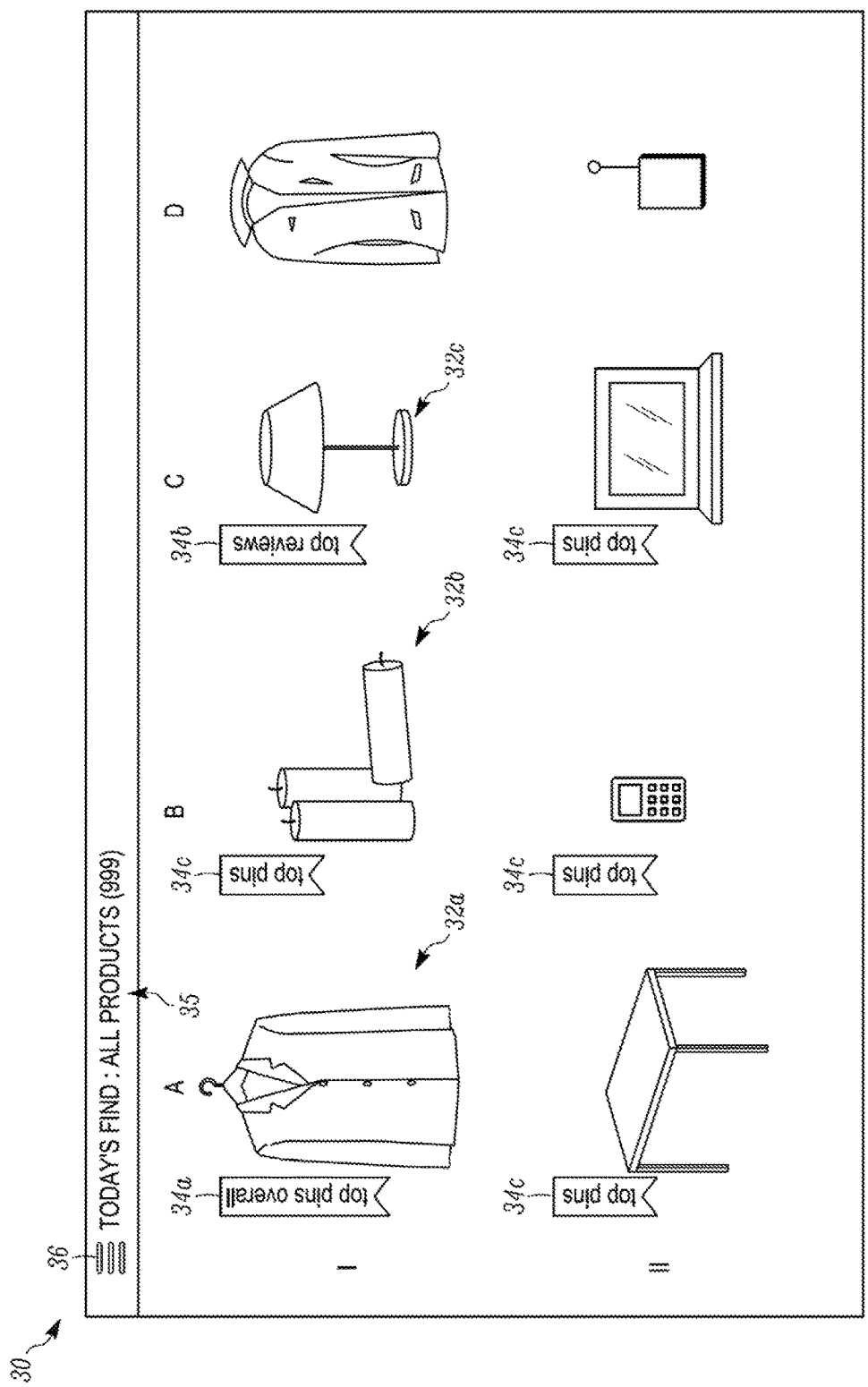
FIG. 2 illustrates a GUI of a website as described herein.

With reference to FIG. 2, an example of a main GUI 30 of the website displaying trending products is illustrated. Images of a plurality of trending products 32a, 32b, 32c . . . 32n are displayed on the main GUI. As illustrated, each product image is displayed without the price of the respective product and without text naming, describing or identifying the respective product. The images 32a,b,c . . . n are displayed on the GUI in an arrangement of a plurality of rows I, II, . . . N and a plurality of columns A, B, C . . . N. Any number of rows and columns can be used. In one embodiment, there are at least 4 rows and 4 columns on the main GUI 30, with additional rows being added by scrolling down to the bottom of the page.

The images can be arranged in any desired order on the GUI. In one embodiment, the images are ordered in order of most popular or most highly trending, starting from the top row, upper left image being the most popular or highly trending and moving left to right, then down to the next row, etc. However, other ordering schemes can be used.

On the main GUI 30, one or more badge icons are displayed adjacent to certain ones of the product images. The badge icons indicate products that are trending more than the others. For example, a badge icon 34a can be used to designate the trending product out of all of the trending products that has received the largest number of recommendations, such as the largest number of pins from Pinterest. The total number of trending products can be displayed at 35. The badge icon 34b can be used to designate a product that has received a large number, for example 30 or more, of positive reviews. Other badge icons 34c can be used to designate the products that have received the largest number of recommendations, such as the largest number of pins from Pinterest, for particular product categories.

Figure 3:
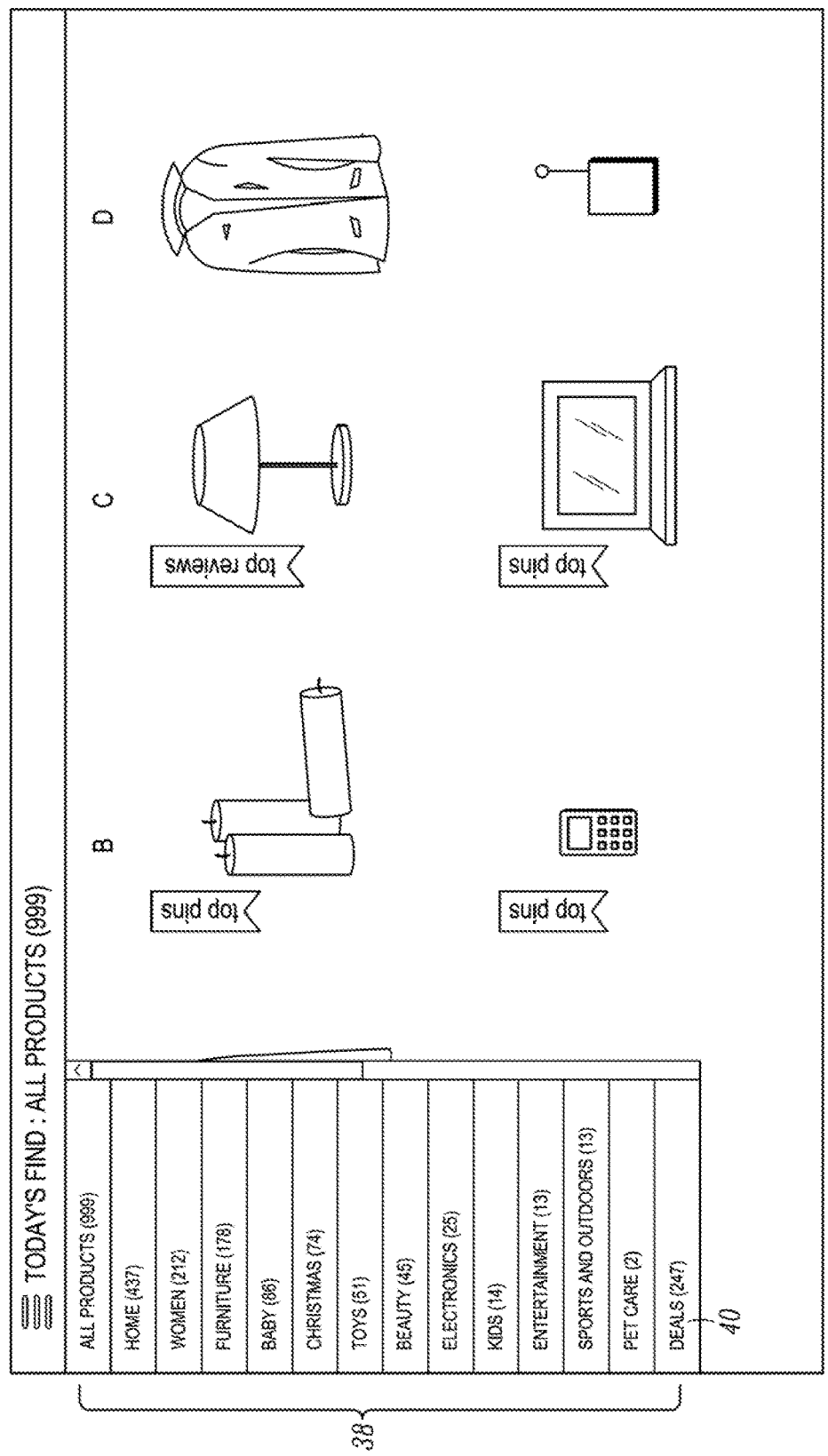
FIG. 3 illustrates a drop down list on the GUI by which a user can view trending products based on product category.

The GUI 30 further includes a link 36 that when selected by the user, displays a drop down list 38 on the GUI (shown in FIG. 3) of product categories into which the trending products are grouped. With reference to FIG. 3, the name of the product category and the number of trending products within that category are listed. Each product category is a link that can be selected by the user in order to display only those trending products belonging to the selected category.

A user can select a link or select an image in any manner. For example, a selection can be made by hovering a cursor over an object to be selected; a selection can be made by a user placing a cursor on the object and using a mouse device to click the object; a selection can be made by the user using her finger to hover over or physically touch the display screen at the location of the object to be selected; a selection can be made using voice commands.

One of the product categories in the drop down list 38 is labeled "deals" 40. The "deals" category is a link that can be selected to display only those trending products that are currently subject to a sales promotion. So if the "deals" link 40 is selected, not only are the products trending, but the displayed products are also subject to some form of sales promotion, which could be a discount, coupon, rebate, freebie, prize, sample or other form of promotion.

Figure 4:
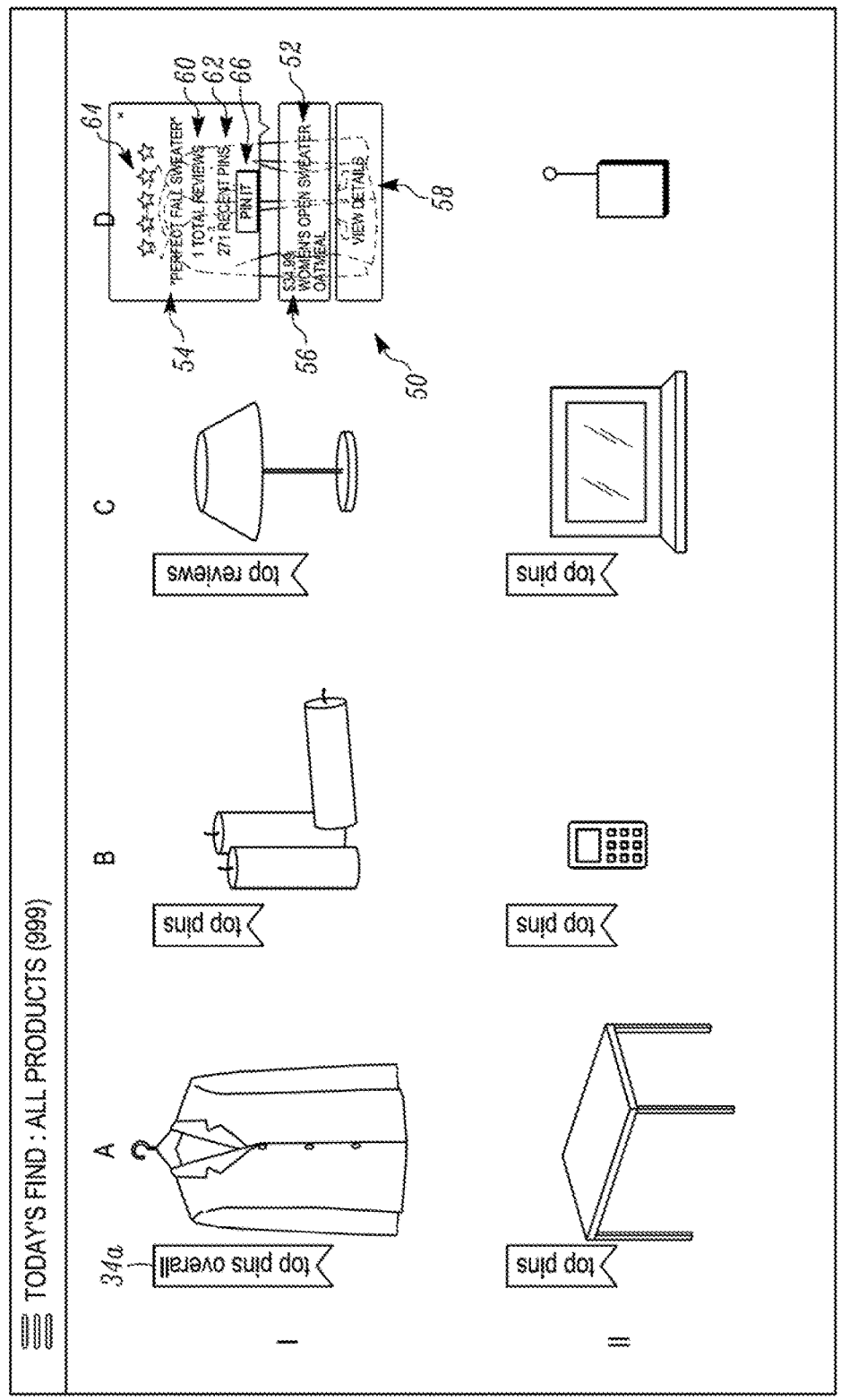
FIG. 4 illustrates an overlay image that is displayed over a product image when a user selects the product image.

Returning to FIG. 2, each product image is displayed as a link that allows each image to be selected by the user on the GUI 30. When one of the product images is selected, an overlay image 50 (seen in FIG. 4) is displayed over at least a part of the selected product image with the selected product image remaining displayed in the background. With reference to FIG. 4, the overlay image 50 can display various information on the selected product. Examples of information that can be displayed can include, but is not limited to, text naming or describing the product 52, comments 54 on the product from a review of the product by a prior purchaser, the price 56 of that product, a link 58 that directs to another web page, such as the main website of the retailer, to permit viewing of further details of that product including ordering/purchasing options from the retailer selling the product, the total number of positive reviews 60 for that product, the total number of recommendations 62 for that product, and a star rating system 64 that indicates how highly rated the product is. In one embodiment, all displayed products will have at least a four star rating. A link 66 to one or more social networks, for example Pinterest, can also be provided that allows the user to provide a recommendation of the selected product.

Returning to FIG. 2, filters can be utilized to limit the trending products that are displayed on the GUI. For example, trending products that are not in stock of the retailer selling the product may not be shown. In addition, products that do not have an average review score from prior purchasers that is equal to or exceeds the threshold may not be shown. In addition, products in certain product categories, such as out of season products, may not be shown.

In an embodiment, products that are trending products can be indicated as such on the retailer's main website to alert users that may be shopping on the main website that the products are trending.

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system comprising a graphical user interface (GUI) displayable on a display device, the GUI including:
   a plurality of product images displayable on the display device, each product image being of a product that is determined to be trending within the past seven days or less prior to being displayed, wherein determining whether the product is trending includes information from one or more social networks, the information from the one or more social networks including a number of positive reviews being greater than a minimum threshold, wherein the positive reviews include specifically designed approval mechanisms associated with the one or more social networks, and in response to determining that one of the plurality of product images is not in season, the one of the plurality of product images is determined to not be trending; and
   each product image is displayable without a price of the respective product and without text naming, describing or identifying the respective product, wherein each product image can be selected, and when one of the product images is selected, in a location of at least a part of the selected product image, the price of that product, text naming or describing that product, and a link to permit viewing of further details of that product are displayable.

2. The system of claim 1, wherein each product is determined to be trending based on a total number of positive reviews of the product and/or a total number of recommendations of the product via the one or more social networks.

3. The system of claim 2, wherein each product is determined to be trending based on the total number of positive reviews of the product and the total number of recommendations of the product via the one or more social networks.

4. The system of claim 1, wherein each product image is of a product that is determined to be trending within the past three days or less prior to being displayed, and no product images are displayable of products that are not trending within the past three days or less.

5. The system of claim 3, further comprising one or more of the following:
   i) the positive reviews are from a website of a retailer that sells the products, and the displayable product images have an average review score from the retailer website that is equal to or exceeds the minimum threshold; and
   ii) each product image is of a product that is in stock.

6. The system of claim 3, further comprising a badge icon displayable adjacent to one of the product images for the product that has received the largest number of positive reviews or the largest number of recommendations.

7. The system of claim 3, further comprising a first badge icon displayable adjacent to one of the product images for the product that has received the largest number of positive reviews, and a second badge icon displayable adjacent to one of the product images for the product that has received the largest number of recommendations.

8. The system of claim 7, wherein the products are grouped into product categories; and
   for each product category, one of the badge icons is displayable adjacent to one of the product images for the product in the product category that has received the largest number of positive reviews or the largest number of recommendations.

9. The system of claim 1, further including a link that, when selected, causes only the product images of products that are currently subject to a sales promotion to be displayable.

10. The system of claim 3, when one of the product images is selected, in the location of at least a part of the selected product image, the total number of positive reviews for that product and the total number of recommendations for that product are displayable.

11. The system of claim 1, wherein the plurality of product images are displayable on the display device in an arrangement of rows and columns including at least 4 columns.

12. An Internet website system, comprising:
   at least one server that is connectable to the Internet and that is configured to provide a website that is viewable on the Internet, the website displays a plurality of separate product images arranged in a plurality of rows and columns;
   each product image is of a product that is for sale by a company and has received at least one positive product review and/or has received at least one recommendation via at least one social network within a predetermined time period prior to being displayed;
   each product image is displayed without a price of the respective product and without text naming, describing or identifying the respective product; the website does not display any product images of products that have not received at least one positive product review or at least one recommendation via at least one social network within the predetermined time period; and each product image is of a product that is in stock for sale by the company, wherein each product image can be selected, and when one of the product images is selected, in a location of at least a part of the selected product image, the price of that product, text naming or describing that product, and a link to permit viewing of further details of that product are displayable.

13. The Internet website system of claim 12, further comprising a badge icon displayed adjacent to one of the product images for the product that has received the largest number of positive product reviews or the largest number of recommendations.

14. The Internet website system of claim 12, wherein the website includes a deals link that, when selected, causes only the product images of products that are currently subject to a sales promotion to be displayed.

15. A computer-implemented method of presenting products to a consumer for purchase via a graphical user interface (GUI) on a display device of the consumer, comprising:

determining products that are trending within the past seven days based on information from at least one social network, the information from the one or more social networks including a number of positive reviews being greater than a minimum threshold, wherein the positive reviews include specifically designed approval mechanisms associated with the one or more social networks, and in response to determining that one of the plurality of product images is not in season, the one of the plurality of product images is determined to not be trending;

via a website that is accessible by the consumer and that is rendered via one or more servers, displaying on the display device of the consumer a product image of each trending product, and displaying each product image without a price of the respective product and without text naming, describing or identifying the respective product, wherein each product image can be selected, and when one of the product images is selected, in a location of at least a part of the selected product image, the price of that product, text naming or describing that product, and a link to permit viewing of further details of that product are displayable.

16. The method of claim 15, wherein determining products that are trending comprises determining products that are trending within the past three days prior to being displayed, and no product images are displayed of products that are not trending within the past three days.

17. The method of claim 15, further comprising filtering the products determined to be trending so that:
i) the positive reviews are from a website of a retailer that sells the products, and the displayed products have an average review score from the retailer website that is equal to or exceeds a predetermined threshold; and
ii) each product image is of a product that is in stock.

18. The method of claim 15, further comprising displaying a badge icon adjacent to one of the product images for the product that has received the largest number of positive reviews or the largest number of recommendations.

\* \* \* \* \*